United States Patent [19]

Horii et al.

[11] E Re. 28,597

[45] Reissued Oct. 28, 1975

[54] RESISTOR

[75] Inventors: Kazuo Horii; Kazuo Ohya; Matuo Zama; Hiroyuki Takashina, all of Tokyo, Japan

[73] Assignee: TDK Electronics Co., Ltd., Tokyo, Japan

[22] Filed: Feb. 20, 1975

[21] Appl. No.: 551,091

Related U.S. Patent Documents

Reissue of:

[64] Patent No.: 3,824,521
Issued: July 16, 1974
Appl. No.: 400,345
Filed: Sept. 24, 1973

[30] Foreign Application Priority Data

Sept. 27, 1972 Japan ..... 47-96904

[52] U.S. Cl. ..... 338/275; 338/254; 338/293
[51] Int. Cl.[2] ..... H01C 1/034
[58] Field of Search ..... 338/254, 275, 262, 293, 338/308

[56] References Cited

UNITED STATES PATENTS

| | | | |
|---|---|---|---|
| 1,842,433 | 1/1932 | Terwilligor | 338/262 |
| 2,692,321 | 10/1954 | Hicks | 338/254 |
| 3,405,381 | 10/1968 | Zandoran | 338/254 |

*Primary Examiner*—E. A. Goldberg
*Attorney, Agent, or Firm*—Wolfe, Hubbard, Leydig, Voit & Osann, Ltd.

[57] ABSTRACT

An improved thin-film resistor low in the resistance temperature coefficient is provided. A metal film or foil is bonded with a thermosetting resin onto an insulating base plate having a lower linear expansion coefficient than the metal and is etching-processed so as to be of a desired resistance pattern. The difference in the linear expansion coefficient between the metal and the insulating base is selected to be 26 to 66 × $10^{-7}$/°C. The metal and base are covered with a resin so as to be a molded assembly, together with lead wires connected to both ends of the metal.

6 Claims, 6 Drawing Figures

RESISTANCE VARIATION RATE ΔR/R (%)
0.04
0.02
0
-0.02
-0.04
-50
-25
0
25
50
75
100
125
TEMPERATURE (°C)

(1) ALUMINA β = 70 x 10⁻⁷/°C
(2) SODA GLASS β = 110 x 10⁻⁷/°C
(3) BOROSILICATE GLASS β = 40 x 10⁻⁷/°C
RESISTANCE VARIATION RATE ΔR/R (%)
0.08
0.06
0.04
0.02
0
-0.02
-0.04
-0.06
-0.08
-50
-25
0
25
50
75
100
125
TEMPERATURE (°C)
(1)
(2)
(3)

RESISTOR

Matter enclosed in heavy brackets [ ] appears in the original patent but forms no part of this reissue specification; matter printed in italics indicates the additions made by reissue.

---

This invention relates to resistors and, more particularly, to a resistor which is low in the resistance temperature coefficient.

Resistors to be used generally for electronic computors, communication instruments, measuring instruments and the like are required to meet such various requirements that the resistance temperature coefficient (which shall be merely called "temperature coefficient" hereinafter) should be low, that the allowance of the resistance value should be low, that the size should be small, and so on.

In conventional resistors, the one which can meet the above mentioned requirements will be thin film resistors, or wire-wound resistors in which alloys comparatively low in the temperature coefficient are used. However, the thin film resistors are made by a vacuum evaporation or cathode sputtering process and, therefore, they have a defect that they are short of a temperature stability as a property peculiar to thin films, that is, as different from bulky metals.

Generally, in the thin film resistors, the temperature coefficient is ± several 10 to ± several 100 p.p.m./°C and it is very difficult to make the value of the temperature coefficient smaller.

On the other hand, in the case of a wire-wound resistor, as the structure of the resistor is three-dimensional, the residual inductance becomes so high that it is difficult to use the resistor in a high frequency range. Further, it is almost impossible to stably manufacture resistors having the temperature coefficient less than ±5 to −5 p.p.m./°C.

There have been already suggested certain measures to solve such defects in the conventional resistors of the kind referred to, for example, in Zandman et al. U.S. Pat. Nos. 3,405,381 and 3,517,436.

In the techniques suggested in such patents, a foil is bonded to a base with an adhesive resin, which resin causes the balance of the force to be broken and thereby there occurs a distortion of the base, and in order to avoid such phenomena Zandman et al. suggest to apply also on the other surface of the base with the same kind of resin to be of the same thickness, whereby such force that tends to bend the base due to the adhesive resin applied thereto will be balanced. Therefore, there are remarkable limitations to the material and dimensions forming the resin layer and the producing conditions are very difficult.

The present invention has succeeded in solving the above problems by bonding a metal foil on an insulating base having a lower linear expansion coefficient than the metal so that the resistance temperature coefficient will be reduced by the strain produced in the metal foil by the difference between the respective linear expansion coefficients of both.

A main object of the present invention is, therefore, to provide a resistor which is very low in the resistance temperature coefficient.

Another object of the present invention is to provide a resistor low in the residual inductance by bonding a metal foil to an insulating base so that the structure will be substantially two-dimensional.

Further, in a resistor obtained by a vacuum evaporation or cathode sputtering process, as a thin metal film is used, properties peculiar to such thin film are shown and the resistance is unstable in respect of the temperature. As a further object, the present invention is to provide a resistor stable in the resistance by utilizing the properties of a bulky metal.

The present invention shall now be explained in detail with reference to certain preferred embodiments in conjunction with the accompanying drawings, in which.

The resistor according to the present invention is made as follows.

An Ni - Cr alloy is rolled to be of a thickness of about 1 to 10$\mu$ by a known process. The Ni - Cr alloy is of Ni/Cr=90/10 to 70/30 at the weight ratio. As additives thereto, Cu, Al, Si and Mn are used to adjust the temperature coefficient and linear expansion coefficient of the alloy. The amounts of the addition of these additives by weight percent are:

| | |
|---|---|
| Cu | 2 to 5% |
| Al | 0.5 to 3% |
| Si | 0.5 to 2% |
| Mn | 0.5 to 4% |

Figure 1:
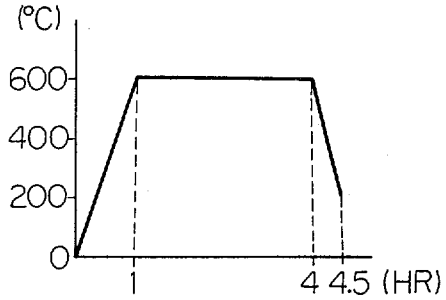
FIG. 1 shows a heat-treatment curve in the resistor according to the present invention.

A desired linear expansion coefficient of about 136 × $10^{-7}$/°C is thus obtained. The metal foil of the alloy thus made and rolled as above is then heat-treated in a vacuum or inert gas. For the heat-treatment, it is desirable to keep the foil at about 600°C for 3 hours with the rates of the temperature rise and fall as shown in FIG. 1.

Such insulating base having a linear expansion coefficient in the range of 40 × $10^{-7}$/°C to 125 × $10^{-7}$/°C which is lower than that of the Ni - Cr metal foil as, for example, of borosilicate glass, sintered alumina, soda glass or the like is used. The relation between the thickness of the base and the thickness of the metal foil is selected to be of such a ratio that the thickness of the base / the thickness of the metal foil = 100 to 1000.

The metal foil is then adhered to a surface of such an insulating base as above. An adhesive is thinly applied onto said base. At this time, the thickness of the adhesive should be preferably about 10$\mu$, and it is also preferable to use an adhesive made of a thermosetting resin.

Further, in the present invention, the difference in the linear expansion coefficient $\beta$ between the base and metal foil is to be effectively utilized. For this purpose, it is desirable that the difference in the coefficient $\beta$ between the base and metal foil is in the range of 26 to 66 × $10^{-7}$/°C. If the difference in the coefficient $\beta$ is made to be larger than $66 \times 10^{-7}$/°C, only resistance-temperature coefficient as low as in the conventional technique will be obtained. Even if it is made smaller than $26 \times 10^{-7}$/°C, only a large value of the resistance-temperature coefficient will be obtained.

The metal foil bonded to the base as above is then etching-processed depending on desired resistance pattern of each kind, then the insulating base including the foil of desired insulating pattern is individually cut, lead wires (for example, tin-plated copper wires of a diameter of 0.16 mm.) are welded to it to form terminals. Then the product is adjusted to be of a desired resistance value by trimming. After the adjustment, the thus obtained resistance element is molded with a phenol resin or epoxy resin so as to be enclosed in the molded resin.

Figure 2:
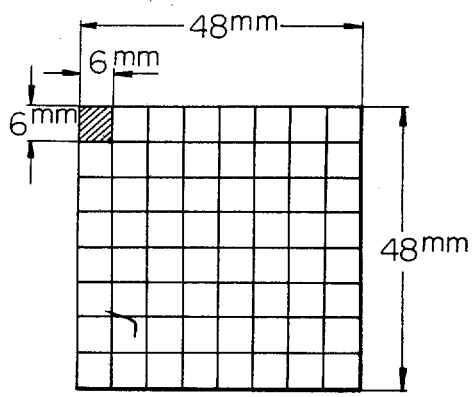
FIG. 2 shows an example of dimensions of the insulating base employed in the present invention.
Figure 3:
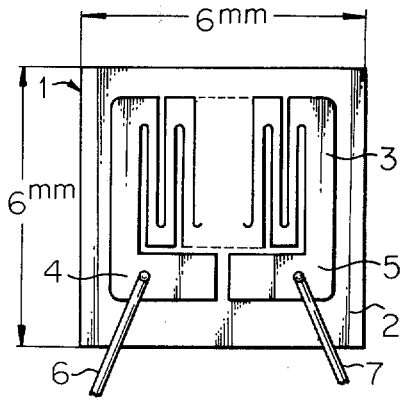
FIG. 3 shows a resistance pattern provided on the base.
Figure 4:
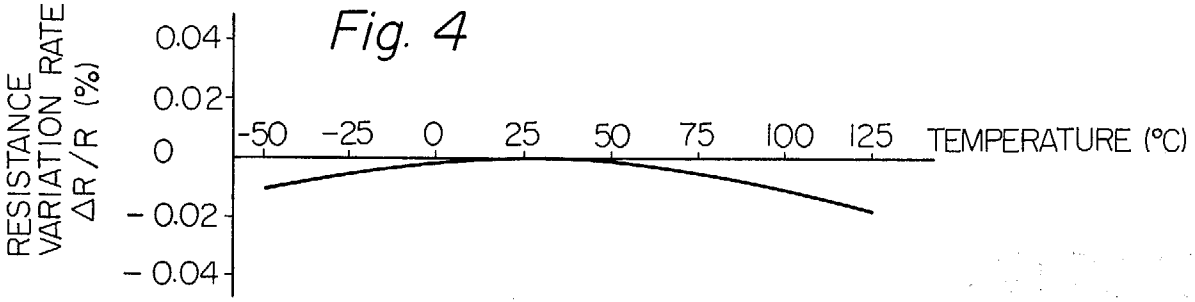
FIGS. 4 and 5 are diagrams showing resistance variation rate due to temperature of the resistors according to the present invention.

An experimental example shall be explained in the following:

A metal foil of a thickness of 3'$\mu$ was made of an Ni - Cr alloy of Ni/Cr of 85/15 and additives of 4 percent by weight Cu, 2 percent by weight Al, 1 percent by weight Si and 1 percent by weight Mn, and was heat-treated as shown in FIG. 1. A base was of sintered alumina of 48 mm. long, 48 mm. wide and 0.6 mm. thick (see FIG. 2). This base was thinly painted with a bisphenol type denatured epoxy resin and the above mentioned metal foil was bonded to it. It was etched in squares of 6 mm. × 6 mm. as shown in FIG. 3 to form a resistance pattern. In the drawing, 1 is a base, 2 is an insulation part, 3 is an etched part, 4 and 5 are terminal parts of the resistance body, 6 and 7 are lead wires which are spot-welded to the terminal parts of the resistance body. The lead wire should be preferably a tin-plated copper wire of a diameter of 0.16 mm. The resistance-temperature characteristics in this case were as shown in FIG. 4, in which the abscissa represents the temperature and the ordinate represents the resistance variation.

Figure 5:
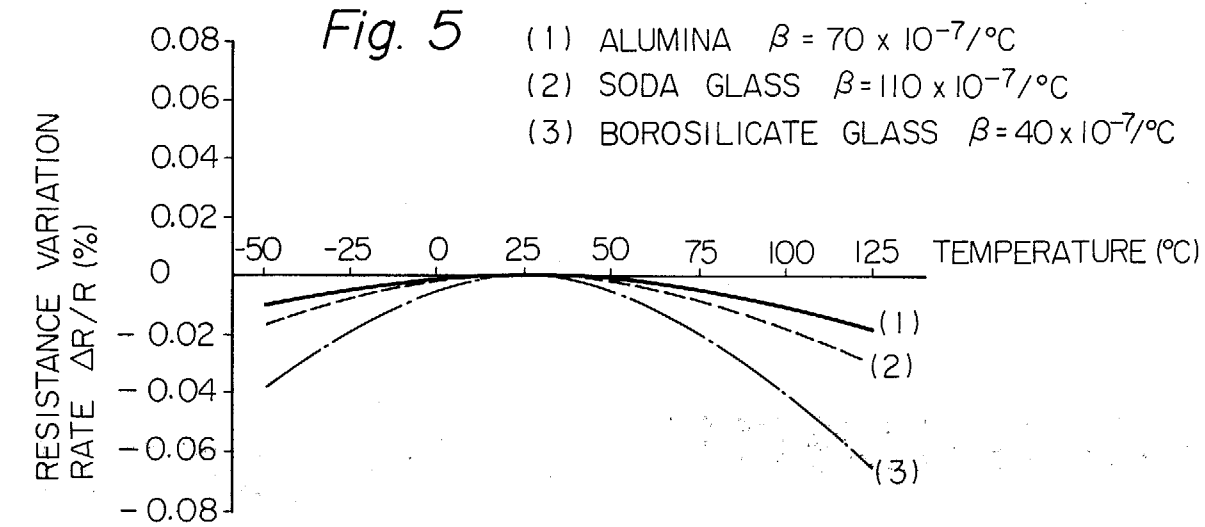
Figure 6:
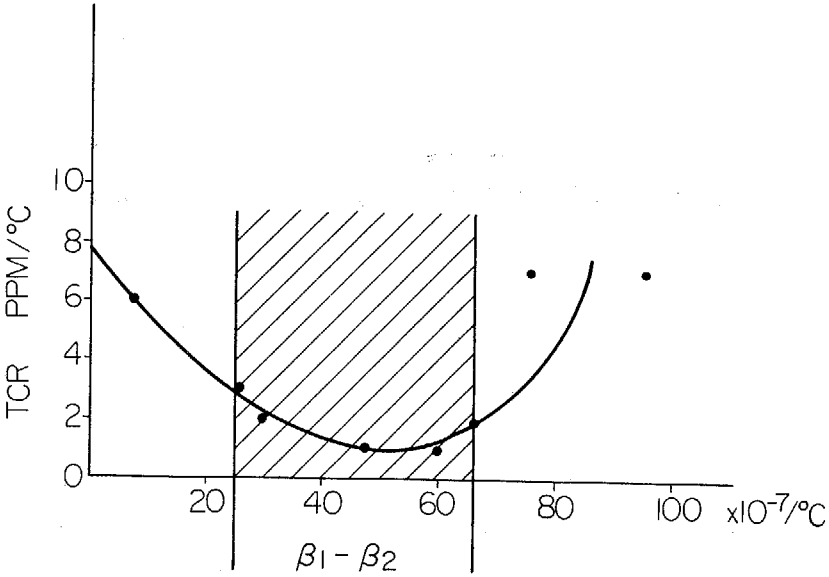
FIG. 6 shows relations between the temperature coefficient and the difference between the respective linear expansion coefficients of the metal foil ($\beta_1$) and of the insulating base ($\beta_2$).

The results when the ratio was varied and the material of the base was varied were as in Table 1.

can be made remarkably low in the case where the difference in the linear expansion coefficient between the metal foil and insulating base is of a certain value. FIG. 5 shows examples of the resistance temperature characteristics of the resistor according to the present invention, showing that the characteristics vary with the difference $\beta$ of the linear expansion coefficient of the base (of sintered alumina, soda glass or borosilicate glass) at a ratio of Ni/Cr of 85/15. When the linear expansion coefficient of the metal foil is $\beta_1$ and the linear expansion coefficient of the base is $\beta_2$, the relations between the difference between them ($\beta_1 - \beta_2$) and the temperature coefficient will be as shown in FIG. 6, in which the batched part shows the range which can be used in the present invention. It will be understood hereby that the present invention has excellent characteristics.

What is claimed is:

1. A resistor comprising an insulating base, a metal foil bonded onto said insulating base with an adhesive, the difference between the linear expansion coefficient of said metal foil and that of said insulating base being 26 to $66 \times 10^{-7}$/°C, said metal foil being formed in a resistance pattern of a desired length by etching, lead wires connected to the respective ends of said metal foil and a mold covering an assembly of said base, metal foil and lead wires.

2. A resistor according to claim 1 wherein said metal foil is of an Ni - Cr alloy of a weight ratio of Ni/Cr of 90/10 to 70/30.

3. A resistor according to claim 2 wherein Cu, Al, Si and Mn are added as additives to said Ni - Cr alloy.

4. A resistor according to claim 1 wherein the ratio of the thickness of the insulating base to the thickness of the metal foil is 100 to 1,000 : 1.

5. A resistor according to claim 1 wherein the linear expansion coefficient of said metal foil is substantially $136 \times 10^{-7}$/°C and the linear expansion coefficient of said base is $70 \times 10^{-7}$/°C.

TABLE 1

| Weight ratio of Ni/Cr / Linear Expansion Coefficient ($\beta_1$ of the metal foil / Linear Expansion Coefficient ($\beta_2$) of the base | | Resistance temperature coefficient (in p.p.m./°C) obtained by the ratio of Ni/Cr and the material of the base: 77/23 | | 80/20 | | 85/15 | |
|---|---|---|---|---|---|---|---|
| Base | | $100\times10^{-7}$/°C | | $118\times70^{-7}$/°C | | $136\times10^{-7}$/°C | |
| Borosilicate glass | $40\times10^{-7}$/°C | Resistance temperature coefficient (p.p.m./°C): −1 to +1 | $\beta_1-\beta_2=60\times10^{-7}$/°C | Resistance temperature coefficient (p.p.m./°C): −7 to +7 | $\beta_1-\beta_2=78\times10^{-7}$/°C | Resistance temperature coefficient (p.p.m./°C): −7 to +7 | $\beta_1-\beta_2=96\times10^{-7}$/°C |
| Sintered alumina | $70\times10^{-7}$/°C | Resistance temperature coefficient (p.p.m./°C): −2 to +2 | $\beta_1-\beta_2=30\times10^{-7}$/°C | Resistance temperature coefficient (p.p.m./°C): −1 to +1 | $\beta_1-\beta_2=48\times10^{-7}$/°C | Resistance temperature coefficient (p.p.m./°C): −2 to +2 | $\beta_1-\beta_2=66\times10^{-7}$/°C |
| Soda glass | $110\times10^{-7}$/°C | Resistance temperature coefficient (p.p.m./°C): −10 to +10 | $\beta_1-\beta_2=-10\times10^{-7}$/°C | Resistance temperature coefficient (p.p.m./°C): −6 to +6 | $\beta_1-\beta_2=8\times10^{-7}$/°C | Resistance temperature coefficient (p.p.m./°C): −3 to +3 | $\beta_1-\beta_2=26\times10^{-7}$/°C |

In the above table, the temperature coefficient was calculated by measuring the resistance values at temperatures of −55°C, +25°C and +125°C and making 25°C to be a base.

As evident from Table 1, the temperature coefficient

6. A resistor according to claim 1 wherein said metal foil is of an alloy of Ni/Cr of 85/15 containing 4 percent by weight Cu, 2 percent by weight Al, 1 percent by weight Si and 1 percent by weight Mn.

* * * * *